(12) United States Patent
Ho et al.

(10) Patent No.: US 11,092,877 B2
(45) Date of Patent: Aug. 17, 2021

(54) INFLATABLE SOFT BOX

(71) Applicants: SHENZHEN FOTOTECH PHOTOGRAPHIC EQUIPMENT CO., LTD, Shenzhen (CN); Yong Zhang, Shanghai (CN)

(72) Inventors: Chai Yee Ho, Shenzhen (CN); Yong Zhang, Shanghai (CN)

(73) Assignees: SHENZHEN FOTOTECH PHOTOGRAPHIC EQUIPMENT CO., LTD, Shenzhen (CN); Yong Zhang, Shanghai (CN)

( * ) Notice: Subject to any disclaimer, the term of this patent is extended or adjusted under 35 U.S.C. 154(b) by 0 days.

(21) Appl. No.: 16/921,973

(22) Filed: Jul. 7, 2020

(65) Prior Publication Data

US 2021/0011356 A1 Jan. 14, 2021

(30) Foreign Application Priority Data

Jul. 9, 2019 (CN) .......................... 201921057375.6
Feb. 21, 2020 (CN) .......................... 202020189784.8

(51) Int. Cl.
| | |
|---|---|
| *G03B 15/06* | (2021.01) |
| *F21V 7/18* | (2006.01) |
| *G03B 17/56* | (2021.01) |
| *F21V 3/02* | (2006.01) |
| *F21V 29/10* | (2015.01) |
| *F21V 21/092* | (2006.01) |

(52) U.S. Cl.
CPC .............. *G03B 15/06* (2013.01); *F21V 3/026* (2013.01); *F21V 7/18* (2013.01); *F21V 29/10* (2015.01); *G03B 17/566* (2013.01); *F21V 21/092* (2013.01); *G03B 2215/0592* (2013.01)

(58) Field of Classification Search
CPC .................. G03B 15/06; G03B 17/566; G03B 2215/0592; G03B 15/07; F21V 7/18; F21V 21/092; F21V 21/0925; F21V 3/026; F21V 29/10
See application file for complete search history.

(56) References Cited

U.S. PATENT DOCUMENTS

| | | | |
|---|---|---|---|
| 8,511,365 B2 * | 8/2013 | McIntosh ............. | G03B 21/585 160/368.1 |
| 9,080,736 B1 * | 7/2015 | Salzinger ............... | H05B 47/11 |
| 2012/0224359 A1 * | 9/2012 | Chun ........................ | F21L 4/08 362/183 |
| 2014/0091951 A1 * | 4/2014 | Miller ..................... | E01F 9/615 340/908 |

(Continued)

*Primary Examiner* — Alan B Cariaso
(74) *Attorney, Agent, or Firm* — Bayramoglu Law Offices LLC (57) ABSTRACT

Disclosed is an inflatable soft box, which belongs to the technical field of photography and film and television. The present application compromises a flexible case. An inflatable nozzle is provided on the flexible case, and the inflatable nozzle is used to inflate or deflate the flexible case. A soft lamp is provided on the flexible case, and the soft lamp is used to illuminate the flexible case. The structure of the inflatable soft box of the present application is simple. By providing an inflation nozzle on the flexible case, the flexible case is inflated by the inflation nozzle when in use, and the flexible case is inflated; when not in use, the flexible case is deflated by the inflation nozzle, making it easy to carry or move, and convenient for users to use.

14 Claims, 10 Drawing Sheets

(56) References Cited

U.S. PATENT DOCUMENTS

2015/0117030 A1* 4/2015 Pilby ................. F21V 11/00
                                                            362/320
2016/0291447 A1* 10/2016 Branham ............... G03B 15/06

* cited by examiner

INFLATABLE SOFT BOX

CROSS REFERENCE TO RELATED APPLICATION

The present application claims priority to Chinese Patent Application No. 201921057375.6 on 9 Jul. 2019, and Chinese Patent Application No. 202020189784.8 on 21 Feb. 2020, the disclosures of both of which are herein by incorporated by reference.

TECHNICAL FIELD

The present invention relates to the technical field of photography and film and television, in particular to an inflatable soft box.

BACKGROUND

A soft box is a kind of photographic equipment, which can soften the rigid light and make the light quality softer. The light from the soft box is even and soft, and the color saturation is good. It is especially suitable for indoor portrait art photos and still lives. It is conducive to expressing the texture and color of human skin, making the skin texture very delicate, with a large light area and without forming a black shadow. At present, there are many types of soft boxes on the market. Most soft boxes are bulky and not easy to move or carry, which causes inconvenience to users. At the same time, when a soft lamp is needed to use, LED flat camera lights are usually used to obtain soft lamps, but due to the high quality of the existing LED flat camera lights, it is difficult to carry and move, which is not conducive for user to use and will lower the user's satisfaction.

SUMMARY

The present invention is provided with an inflatable soft box, which aims to solve the technical problems that the soft box is large in the prior art and is not easy to carry or move.

In order to solve the above technical problems, the present invention adopts the following technical solution. An inflatable soft box compromises a flexible case, and an inflatable nozzle is provided on the flexible case, and the inflatable nozzle is used to inflate or deflate the flexible case, and a soft lamp provided on the flexible case, the soft lamp is used to illuminate the flexible case. When in use, with the arrangements of flexible case, and the flexible case is provided with a soft lamp and the inflation nozzle inflates the flexible case, the flexible case expands; when not in use, the flexible case is deflated by the inflation nozzle and the flexible case contracts, making it easy to carry or move.

In some embodiments, the flexible case is provided with a transparent area and a lighting area;

The transparent area is used to install the soft lamp, and the soft lamp is installed on the outer side of the flexible case; the lighting area is provided with a translucent soft cloth, the soft cloth is used to convert the light source of the soft lamp into soft light.

In some embodiments, the transparent area is provided with a plurality of protrusions for contacting with the soft lamp.

In this technical solution, by the arrangement of protrusions, the contact area between the flexible case and the soft lamp is further reduced, the gap between the flexible case and the soft lamp is increased, the possibility of air flow between the flexible case and the soft lamp is increased, and the possibility of overheating and damage of the flexible case is reduced.

In some embodiments, it also compromises:

A soft cloth cover, the soft cloth cover is provided outside the flexible case;

A soft lamp is arranged on the area where the flexible case body is exposed to the soft cloth cover, and the soft lamp and the soft cloth cover are detachably connected.

In this technical solution, after the light from the soft lamp passes through the soft cloth cover, and then passes through the honeycomb grid, a parallel light source can be formed, so that the photo taken can express the layered effect of the subject to meet the special need of photography.

In some embodiments, the honeycomb grid is provided with elastic strips at positions close to the corners, and two ends of the elastic strip are respectively fixed on two adjacent sides of the honeycomb grid.

In this technical solution, the honeycomb grid is buckled at the corners of the flexible case by the elastic strip.

In some embodiments, a plurality of suction cup fixing seats for fixing the flexible case are provided on the outside of the flexible case.

In this technical solution, the irradiation angle of the soft box can also be adjusted through the suction cup fixing seat.

In some embodiments, the flexible case is further provided with a shading area, and the shading area is provided with an opaque shading cloth cover.

In this technical solution, through the setting of the shading area, the position selection of the lighting area is realized, the adjustment of the lighting area is further added, the adjustment of the light intensity of the lighting area is also realized, and the application scope of the soft box is increased.

In some embodiments, after the flexible case is inflated, the shape of the flexible case is any one of a sphere, a cylinder, a semi-cylinder, a cuboid, or a cube.

In this technical solution, the structure of the flexible case of the above shape is relatively simple, and the manufacture is relatively simple, which is convenient for the user.

Compared with the prior art, the inflatable soft box of the present invention has the following beneficial effects:

1. By setting a soft cloth cover on the flexible case, the light emitted by the soft lamp can be softened;

2. By setting an inflation nozzle on the flexible case, when in use, the flexible case is inflated through the inflation nozzle, and the flexible case is inflated; when not in use, the flexible case is deflated through the inflation nozzle to facilitate moving or carrying;

3. By setting the protrusion, the contact area between the flexible case and the flexible LED lamp is further reduced, the gap between the flexible case and the flexible LED lamp is increased, the possibility of air flow between the flexible case and the flexible LED lamp is increased, and the possibility of overheating and damage of the flexible case is reduced.

4. By setting the honeycomb grid, the light from the soft lamp passes through the soft cloth cover, and then forms a parallel light source when passing through the honeycomb grid, so that the photos taken can express the layered effect of the subject to meet the special need of photography.

5. By setting the shading cloth cover, the choice of lighting area can be realized, and at the same time the light intensity of the lighting area can be adjusted.

6. By setting the suction cup fixing seat, it is used to fix the flexible case, at the same time, it can also adjust the irradiation angle of the flexible case.

Description of reference numerals: 1. flexible case, 2. transparent area, 3. lighting area, 4. shading area, 5. shading cloth cover, 6. protrusion, 7. slot, 8. rope loop, 9. soft cloth cover, 10. hook-and-loop fastener, 11. inflation nozzle, 12. suction cup fixing seat, 13. suction cup screw, 14. lock nut, 15. soft lamp, 16. support lamp holder, 31. mounting hole, 41. elastic strip, 42. frame, 43. honeycomb-shaped light-transmitting hole, 91. circular bottom, 92. hollow semi-cylinder, 111. through hole.

DETAILED DESCRIPTION

In order to facilitate those skilled in the art to understand the present invention, the invention will be described in further detail below with reference to the drawings. Obviously, the drawings in the following description are only some embodiments of the present invention. For those ordinary skilled in the art, without paying any creative labor, other drawings and other embodiments can be obtained based on these drawings.

In order to make the drawings simple, the figures only schematically show the parts related to the present invention, they do not refer to their actual structure as a product. In addition, in order to make the drawings concise and easy to understand, in some drawings, only one of the components having the same structure or function is schematically shown, or only one of them is marked. In the description, "one" not only means "only one", but also means "more than one".

FIGS. 1 to 11 schematically show the inflatable soft box of the present invention.

Figure 1:
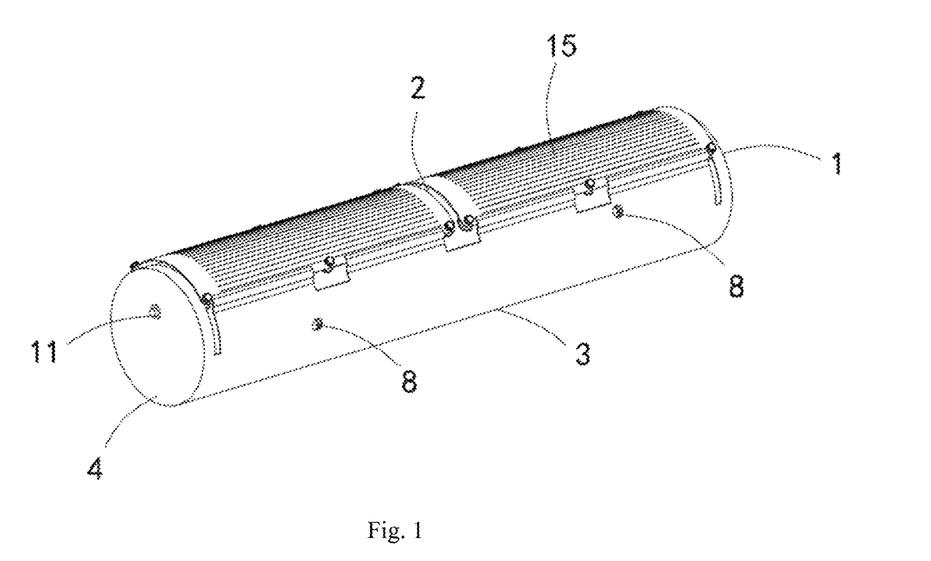
FIG. 1 is a schematic structural view of an inflatable soft box of the present invention when the flexible case is a cylinder.

As is shown in FIG. 1, the inflatable soft box of the present invention compromises a flexible case 1, which can be made of transparent and stretchable material. The flexible case 1 is provided with an inflation nozzle 11, which is used to inflate or deflate the flexible case 1. The user inflates the flexible case 1 through the inflation nozzle 11 and the flexible case 1 expands; the user deflates the flexible case 1 through the inflation nozzle 11 and the flexible case 1 contracts, making it easy to carry or move. In addition, the shape of the flexible case 1 can be set according to actual needs. Specifically, after the flexible case 1 is inflated, the flexible case 1 is any one of a sphere, a cylinder, a semi-cylinder, a cuboid, or a cube; the structure of the flexible case 1 of the above shape is relatively simple, and it is relatively simple to manufacture, which is convenient for users.

In this embodiment, the flexible case 1 is provided with a transparent area 2 and a lighting area 3; the transparent area 2 is used to install a soft lamp 15 which is installed outside the flexible case 1; the lighting area is provided with a translucent soft cloth, which is used to convert the light source of the soft lamp 15 into soft light.

A translucent soft cloth (not shown in the drawings) is provided on the lighting area. The soft cloth is used to convert the light source of the flexible LED lamp into soft light. The soft cloth mainly refers to high temperature resistant translucent plastic, which can transform the light source into soft diffused light.

Specifically, since the flexible case 1 has the transparent area 2, the user can select transparent and stretchable material as the material of the flexible case, and attach the soft cloth to the flexible case 1. The area where the soft cloth is attached to can be used as the lighting area 3, and the area where the soft cloth is not attached to can be used as the transparent area 2.

In this embodiment, when the flexible case 1 is a cylinder, the flexible case 1 can be arranged horizontally, that is, the axis of the flexible case 1 is arranged horizontally; the flexible LED lamp can be placed on the upper side of the curved surface of the flexible case 1, so the upper side of the curved surface of the flexible case 1 can be used as the transparent area 2, and the lower side of the curved surface of the flexible case 1 and the two bottom surfaces of the flexible case 1 can be used as the lighting area 3. Therefore, the lower side of the curved surface of the flexible case 1 and the two bottom surfaces of the flexible case 1 can be provided with soft cloth.

After the flexible LED lamp is placed on the flexible case 1, the light source of the flexible LED lamp can enter the flexible case 1, and then transmit through the soft cloth on the lighting area 3, and the light source can be converted into diffuse light.

In this embodiment, through the setting of the inflatable flexible case 1, when the user needs to move or carry the flexible case 1, the user can directly deflate the flexible box 1 to facilitate the operation. The carrying and moving operations are relatively simple and convenient, increasing the user satisfaction.

Specifically, when the soft box is in use, the user can also fix the flexible case 1 on an external support, thereby realizing the fixing of the flexible case 1 and increasing the stability of the flexible case 1.

When the flexible case 1 is inflated with air, or the gas whose density is close to the air, or is larger than the air, the flexible case 1 can be supported by gravity and supported on the bottom surface, and the user can directly adjust the position of the flexible case 1. When the flexible case 1 is inflated with a gas with a density less than air, such as helium, the flexible case 1 is affected by air buoyancy and can float to the air. Therefore, the flexible case 1 can abut on the ceiling; therefore, the flexible case 1 can be provided with two kinds of inflation nozzles 11, one can inflate the flexible box 1 with a gas of higher density such as air, and the other can inflate the flexible case 1 with a gas of lower density gas such as helium.

Preferably, the flexible case 1 is further provided with a shading area 4, and the shading area 4 is provided with a shading cloth cover (not shown in the figures). Specifically, the shading cloth cover can be provided on the bottom surfaces of the front and back sides of the flexible case 1, that is, the two front and back bottom surfaces can be used as the shading area 4. In the current state, only the lower side of the curved surface of the flexible case 1 can be used as the lighting area 3 for illumination.

In this embodiment, through the setting of the shading area 4, the position selection of the lighting area 3 area is realized, the adjustment of the lighting area 3 area is further added, the light intensity adjustment of the lighting area 3 area is also realized, and the application scope of the soft box is expanded.

Preferably, the flexible case is provided with several rope loops 8 for fixing the flexible box; in this embodiment, the rope loop 8 can be disposed on the curved surface of the flexible case 1 and along the axis of the flexible case 1, the rope loops 8 can be set in two rows. The user can connect one end of the rope to the rope loop 8, the other end of the rope fixed at the remaining fixed position, and adjust the angle of the flexible case 1 by adjusting the length of the rope; through the setting of the rope loop 8, the angle adjustment of the flexible case 1 is realized, which further increases the reliability of the illumination of the lighting area 3.

Preferably, the soft cloth is detachably connected to the flexible case 1; specifically, the soft cloth can be connected to the lower side of the flexible case 1 by means such as a hook-and-loop fastener; when the user requires strong soft light, the user can set thin soft cloth on the flexible case 1, and when the user requires weak soft light, the user can also set a thick soft cloth on the flexible case 1. In this embodiment, the soft cloth is detachably connected to the flexible case 1, which is convenient for replacing the soft cloth, and is also convenient for the user to adjust the light intensity of the lighting position, which expands the scope of application of the soft box.

Figure 2:
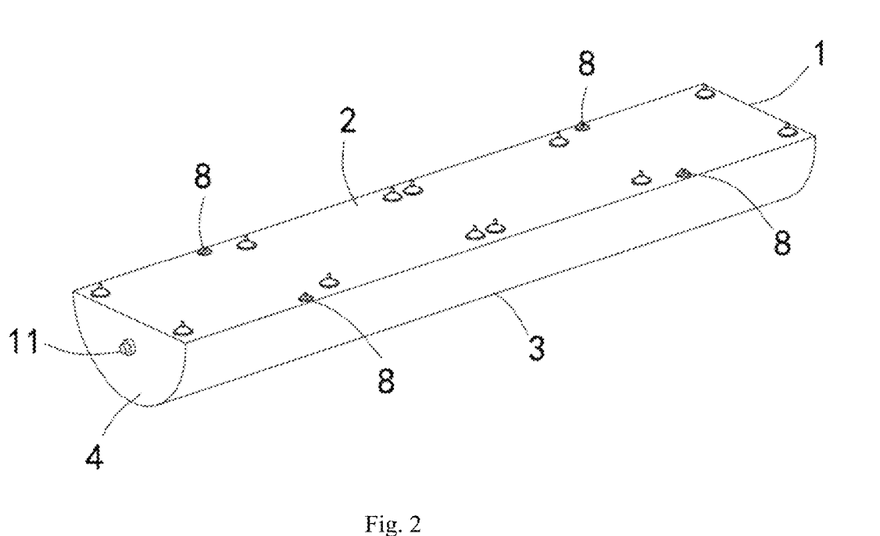
FIG. 2 is a schematic structural view of an inflatable soft box of the present invention when the flexible case is a semi-cylindrical body.
Figure 3:
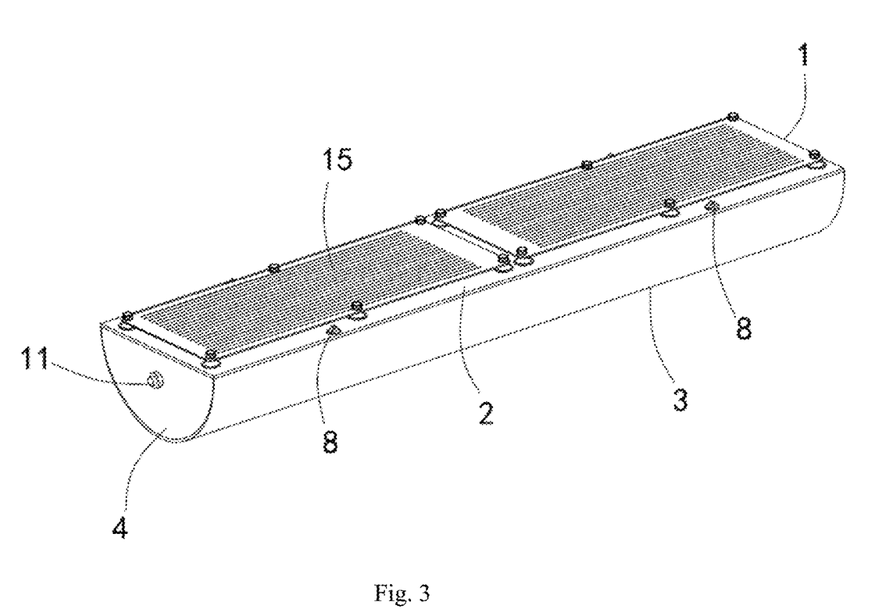
FIG. 3 is a schematic structural view of an inflatable soft box of the present invention when a soft lamp is installed.

According to another embodiment provided by the present invention, as is shown in FIGS. 2 and 3, the difference between this embodiment and the first embodiment lies in the specific structure of the flexible case.

On the basis of the first embodiment, in this embodiment, the flexible case 1 is a semi-cylindrical body, the axis of the flexible case is arranged horizontally, and the upper side of the flexible case 1 is a plane. Therefore, the upper flat surface can be used as the transparent area 2, the lower curved surface can be used as the lighting area 3, and the bottom surfaces on both sides can be used as the shading area 4.

Preferably, since the two ends of the flexible case 1 have low strength and are easy to deform, the strength of the flexible case 1 after being inflated is further increased, and the left and right ends of the flexible case 1 are removed to form a combination of a rectangular upper side and an arcuate lower side.

Preferably, the transparent area 2 is provided with a plurality of protrusions (not shown in the figures) for contacting with the flexible LED lamp; in this embodiment, the arrangement of the protrusions (not shown in the figures) further reduces the contact area between the flexible case 1 and the flexible LED lamp, increases the gap between the flexible case 1 and the flexible LED lamp, increases the possibility of air flow between the flexible case 1 and the flexible LED lamp, and reduces the possibility of overheating and damage of the flexible case 1.

Figure 4:
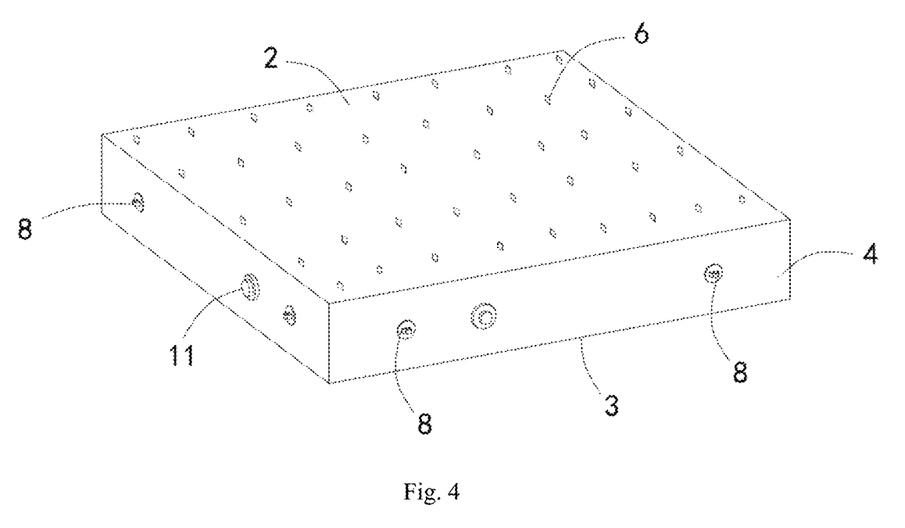
FIG. 4 is a schematic structural view of an inflatable soft box of the present invention when the flexible case is a rectangular parallelepiped.

According to another embodiment provided by the present invention, as shown in FIG. 4, an inflatable soft box, the difference between this embodiment and the second embodiment lies in the specific structure of the flexible case.

Based on the second embodiment, in this embodiment, the flexible case 1 is a rectangular parallelepiped, the upper side of the flexible case 1 can be used as the transparent area 2, the side can be used as the shading area 4, and the shading cloth cover (not shown in the figures) can be arranged on the side of the flexible case. In this embodiment, the shading cloth cover is not shown, the bottom surface can be used as the lighting area 3, and the protrusions 6 can be evenly distributed on the upper transparent area 2.

Figure 5:
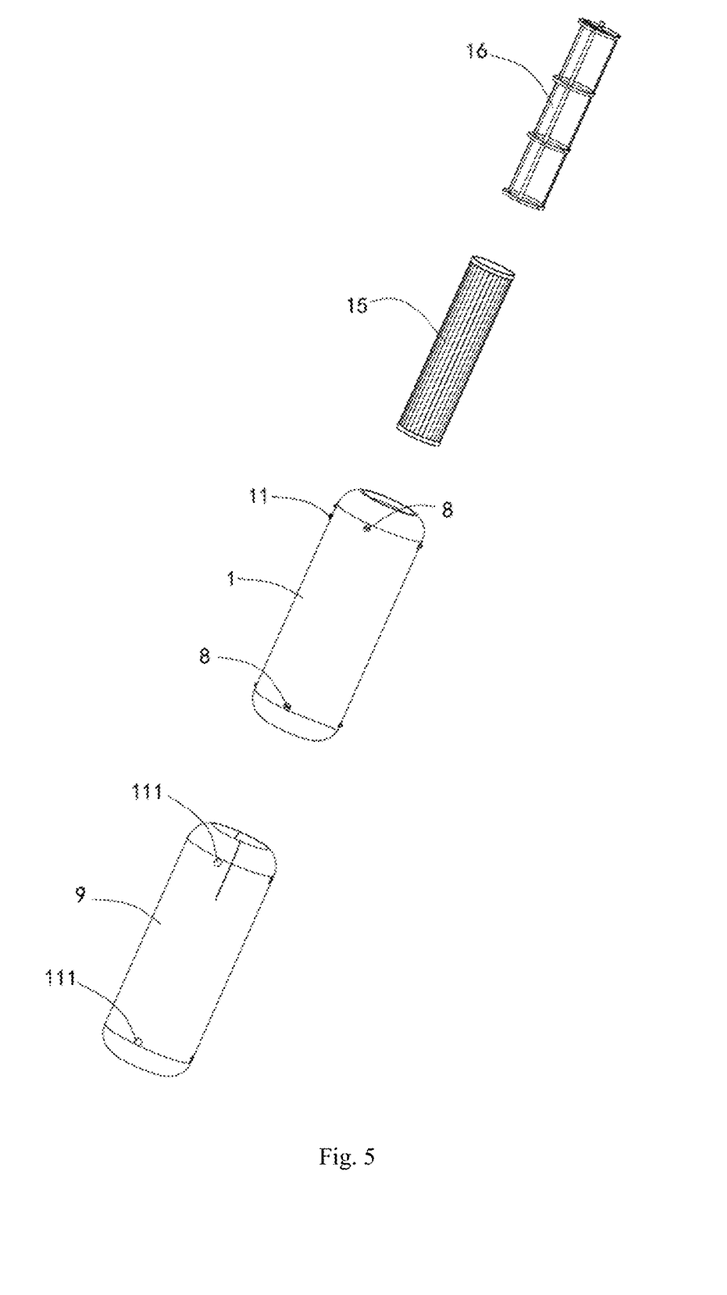
FIG. 5 is a schematic view of the disassembly structure of the inflatable soft box of the present invention when the flexible case is a hollow cylinder.
Figure 6:
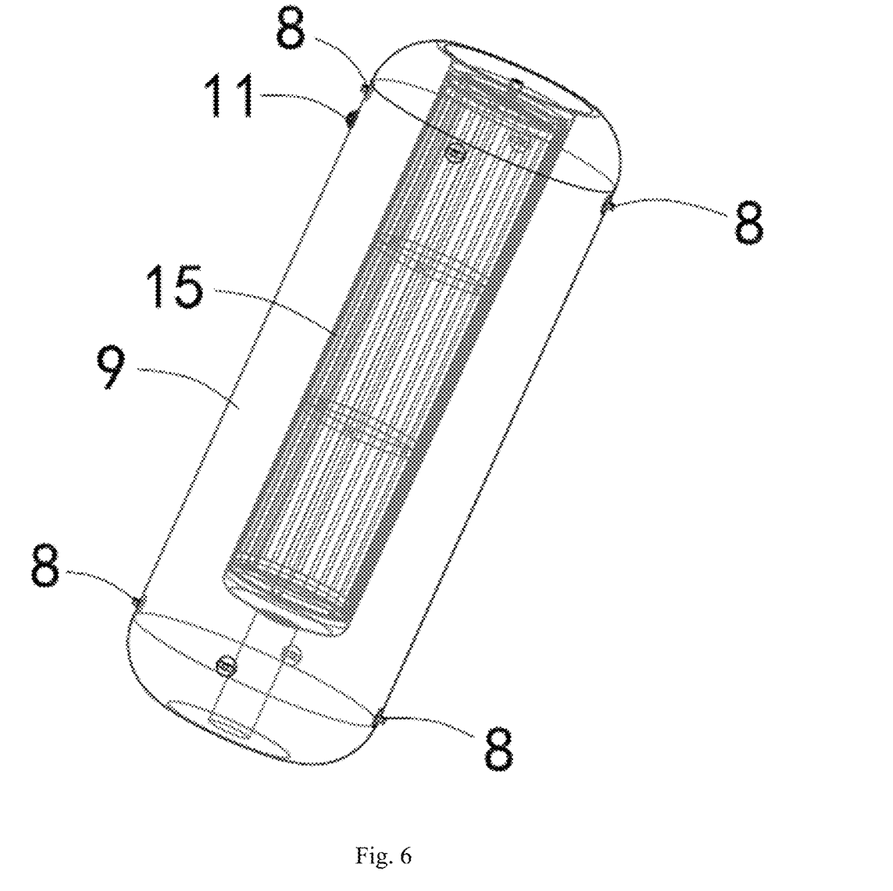
FIG. 6 is a schematic perspective structural view of another inflatable soft box of the present invention.
Figure 7:
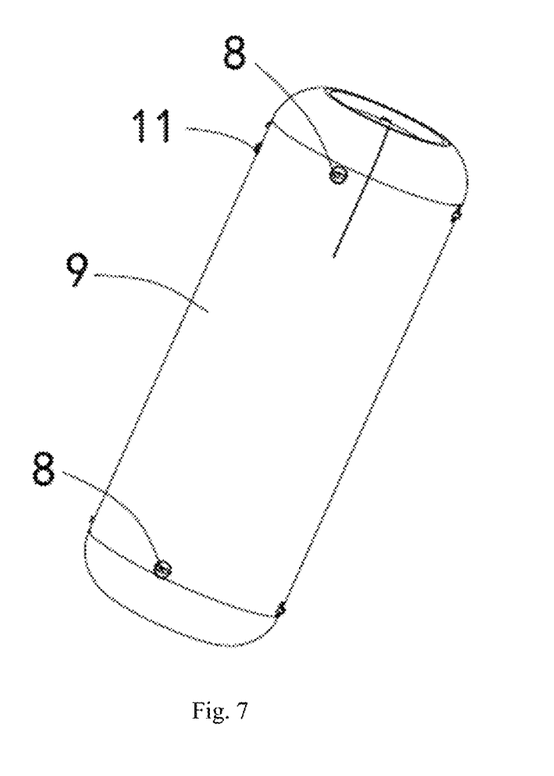
FIG. 7 is a schematic view of the structure of another inflatable soft box after assembly according to the present invention.

According to another embodiment provided by the present invention, as is shown in FIGS. 5 to 7, an inflatable soft box, the difference between this embodiment and the first embodiment lies in the specific structure of the flexible case.

Based on the first embodiment, in this embodiment, the flexible case 1 is a hollow cylinder.

The entire curved surface of the flexible case 1 and the two front and back bottom surfaces can be used as the transparent area 2. A support lamp holder 16 is provided in the flexible case 1, and the soft lamp 15 is wound on the support lamp holder 16. After the flexible case 1 is filled with gas through the inflation nozzle 11, the pressure generated inside the flexible case 1 will bind and fix the soft lamp 15 and the supporting lamp holder 16 tightly. The outer cover of the flexible case 1 is provided with a soft cloth cover 9, which is used to convert the light source of the flexible LED lamp into soft light.

Preferably, the flexible case 1 is provided with several rope loops 8 for fixing the flexible case 1; in this embodiment, the rope loop 8 is provided on the curved surface of the flexible case 1 and the soft cloth cover 9 is provided with a through hole 111 through which the rope loop 8 passes. The user can connect one end of the rope to the rope loop 8, the other end of the rope fixed at the remaining fixed position, and adjust the angle of the flexible case 1 by adjusting the length of the rope; by setting the rope loop 8, the angle adjustment of the flexible case 1 is realized, which further increases the reliability of the illumination of the lighting area 3.

Figure 8:
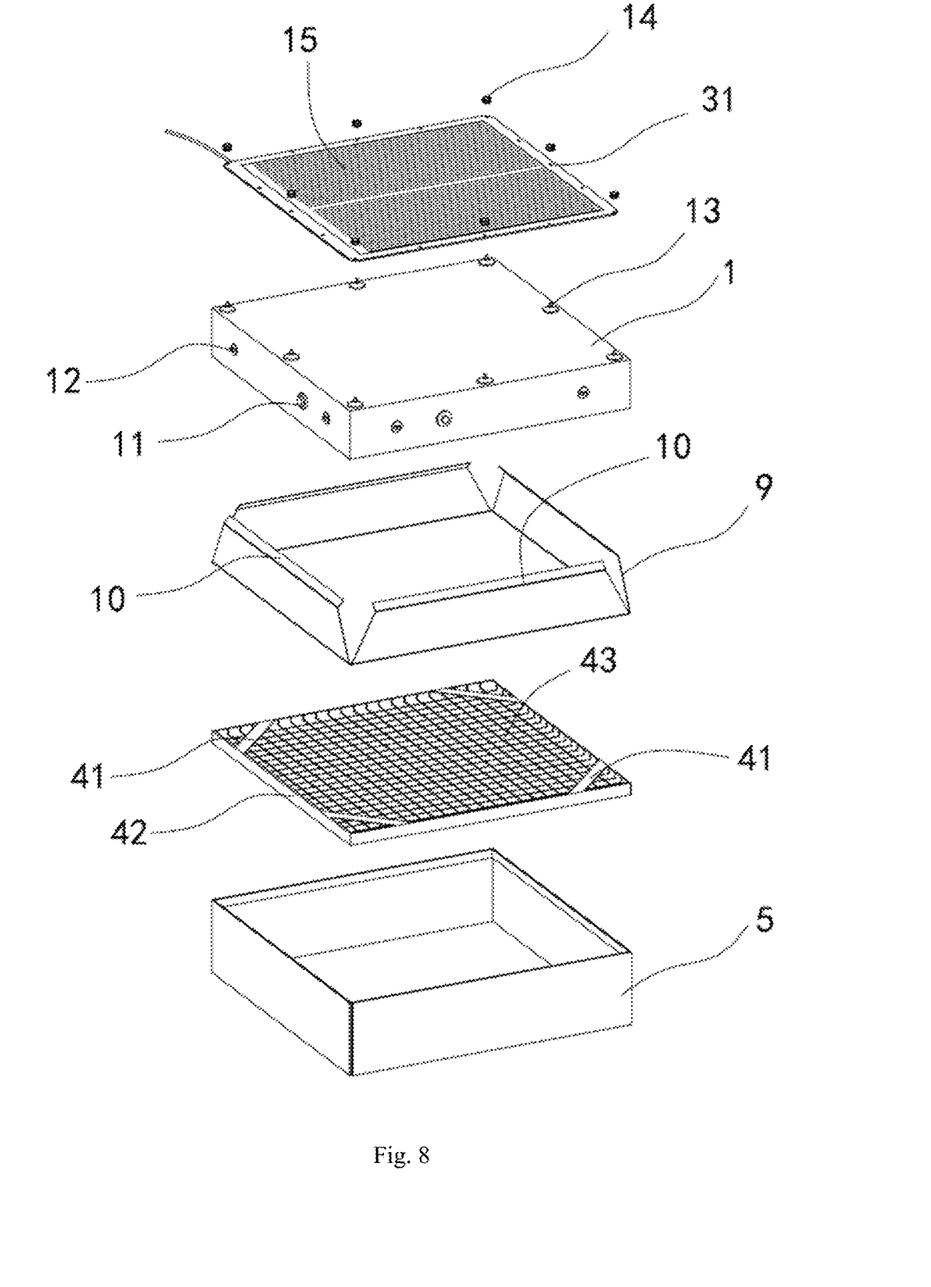
FIG. 8 is a schematic structural view of another inflatable soft box of the present invention.

In another embodiment, as shown in FIG. 8, the flexible case 1 has a rectangular shape. A plurality of suction cup fixing seats 12 are provided on the outer side wall of the flexible case 1, and the suction cup fixing seat 12 compromises a suction cup part and a rope binding hole. The suction cup fixing base 12 is attracted to the side wall of the flexible case 1 through the suction cup part. The user can use a rope to fix one end of the rope to the rope binding hole and the other end of the rope to the remaining fixed position to achieve the fixing of the flexible case 1. In addition, the user can also adjust the rope to adjust the angle of the flexible case 1, which is simple and convenient.

A soft cloth cover 9 is provided outside the flexible case 1, and the shape of the soft cloth cover 9 is adapted to the flexible case 1. The soft cloth cover 9 covers the bottom and four sides of the flexible case 1. Wherein, the material of the soft cloth cover 9 may be a high temperature resistant translucent plastic. The flexible case 1 is provided with a soft lamp 15 on the top area where the soft cloth cover 9 is exposed. A flexible LED lamp may be used. The flexible LED lamp compromises a soft cloth and a plurality of LED lights provided on the soft cloth. The soft lamp 15 and the flexible case 1 are fixedly connected. Specifically, the top of the flexible box 1 is provided with suction cup screws 13 along four edges, and the flexible LED lamp is provided with mounting holes 31 at corresponding positions of the suction cup screws 13. The suction cup screw 13 compromises a suction cup part and a threaded part. The suction cup screw 13 is attracted to the flexible case 1 through the suction cup part. The threaded part of the suction cup screw 13 passes through the mounting hole 31 on the soft lamp 15 and cooperates with the lock nut 14 to fix the soft lamp 15 on the flexible case 1. The light emitted by the soft lamp 15 passes through the soft cloth cover 9 and is transformed into soft diffuse light. The soft lamp 15 and the soft cloth cover 9 are detachably connected. Specifically, the top of the soft cloth cover 9 is provided with hook-and-loop fasteners 10 circumferentially, and the soft cloth cover 9 is bonded to the edges of the soft lamp 15 through the hook-and-loop fasteners 10 to make the flexible case 1, the soft cloth cover 9 and the soft lamp 15 integrated.

The soft cloth cover 9 is provided with a honeycomb grid on the side opposite to the soft lamp 15, and the honeycomb grid presses the soft cloth cover 9 against the bottom of the flexible case 1. The honeycomb grid includes a frame 42 and a honeycomb-shaped light-transmitting hole 43. The honeycomb grid is connected to the flexible case 1. Specifically, the honeycomb grid is provided with elastic strips 41 at positions close to the corners, and the two ends of the elastic strip 41 are respectively fixed on two adjacent sides of the honeycomb grid. In this embodiment, the honeycomb grid has a cubic shape, and the number of elastic strips 41 is correspondingly set to four. The honeycomb grid is buckled at the angular position of the flexible case 1 through the elastic strips 41. Among them, the elastic strip 41 may select an elastic rubber band. When the light from the soft lamp 15 passes through the soft cloth cover 9 and then passes through the honeycomb-shaped light-transmitting holes 43 of the honeycomb grid, a parallel light source can be formed, so that the photograph taken can express the layered effect of the subject to meet the needs of special photography.

Further, a black shading cloth cover 5 is sleeved on the outer side wall of the soft cloth cover 9 circumferentially. The shading cloth cover 5 can shield the four sides of the flexible case 1 so that the light emitted by the soft lamp 15 can only be emitted toward the bottom of the flexible case 1 to realize the selection of the lighting area and adjust the light intensity of the lighting area.

Figure 9:
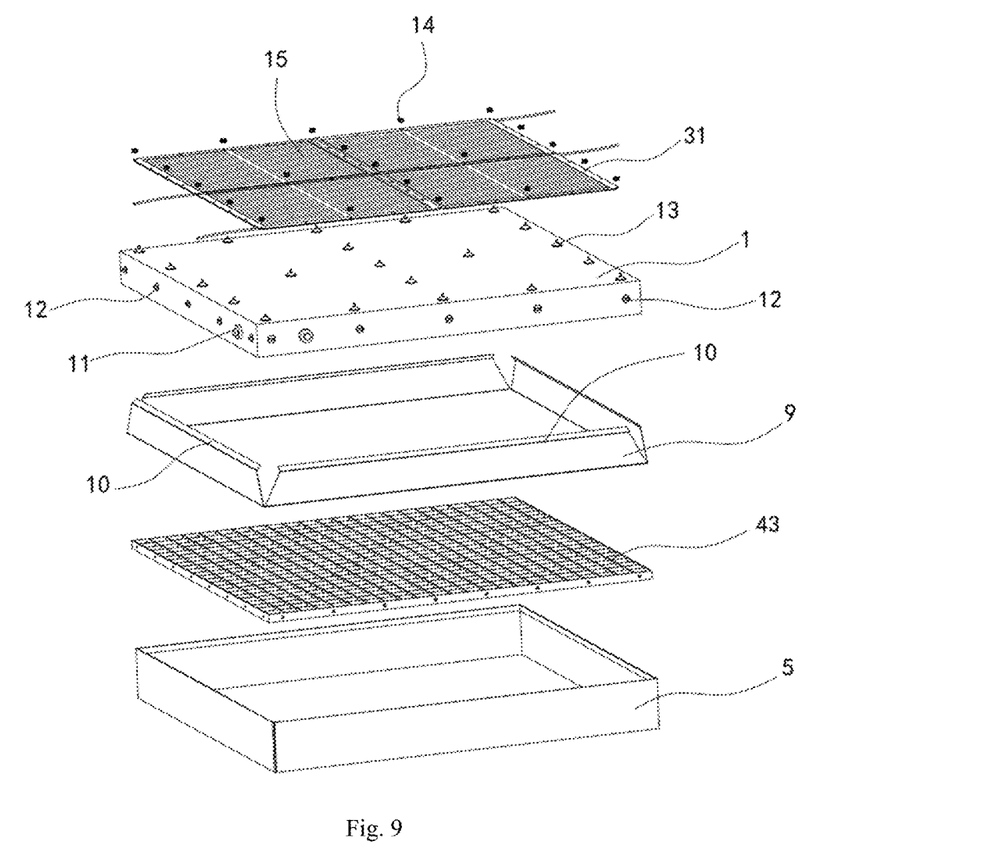
FIG. 9 is a schematic structural view of another inflatable soft box of the present invention.

The only difference between the embodiment in FIG. 9 and the embodiment in FIG. 8 is that the shape of the flexible case 1 is a rectangular parallelepiped. Correspondingly, the shape of the honeycomb grid is designed as a rectangular parallelepiped, and the number of the soft lamp 15 is increased. Of course, the number of specific soft lamp 15 can be designed and increased according to actual needs, so as to improve the applicable scope of the soft box.

Figure 10:
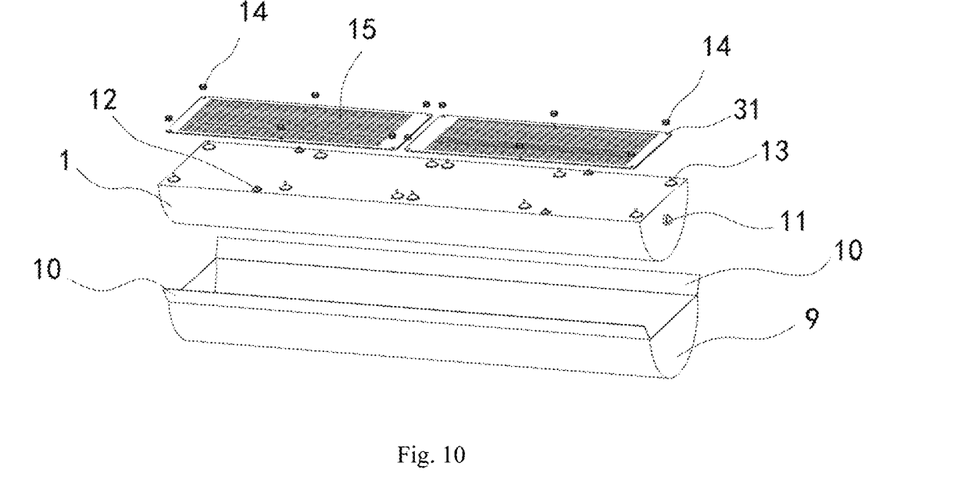
FIG. 10 is a schematic structural view of another inflatable soft box of the present invention.

In another embodiment, as shown in FIG. 10, the shape of the flexible case 1 is semi-cylindrical, the axis of the flexible case 1 is horizontally arranged, and the top of the flexible box 1 is flat. A soft cloth cover 9 is provided outside the flexible case 1, and the shape of the soft cloth cover 9 is adapted to the shape of the flexible case 1. The soft cloth cover 9 is substantially hollow and semi-cylindrical, so that the flexible case 1 can be placed in the soft cloth cover 9. A flexible lamp 15 is provided on the top plane of the flexible box 1 exposed to the soft cloth cover 9, and the flexible lamp 15 is fixedly connected to the flexible case 1. The manner in which the soft lamp 15 is fixed on the flexible case 1 is the same as that in the first embodiment, except that the suction cup screws 13 are arranged along the axis direction of the flexible case 1. The top and bottom sides of the soft cloth cover 9 are provided with hook-and-loop fasteners 10 axially, and the soft cloth cover 9 is bonded to the soft lamp 15 by the hook-and-loop fasteners 10 to make the soft cloth cover 9, the flexible case 1 and the soft light 15 to form one. In addition, in this embodiment, the suction cup fixing seat 12 is provided on the top plane of the flexible case 1 and is arranged along the axis direction of the flexible box 1. The suction cup fixing seat 12 is the same as the embodiment shown in FIG. 8, is used to fix the flexible case land adjust the angle of the flexible case 1.

Figure 11:
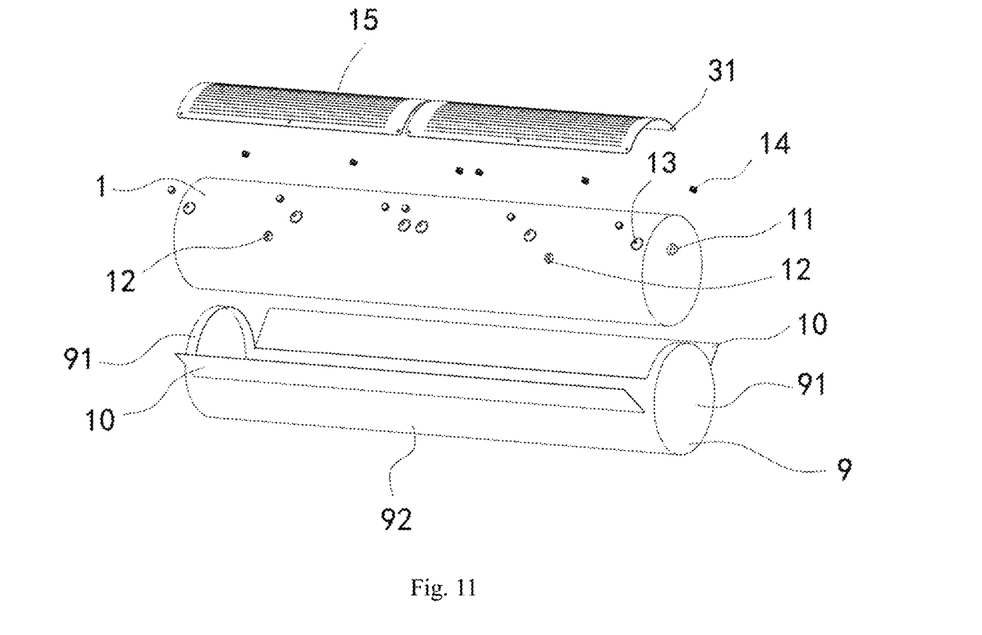
FIG. 11 is a schematic structural view of another inflatable soft box of the present invention.

In another embodiment, as shown in FIG. 11, the shape of the flexible case 1 is a cylinder, and a soft cloth cover 9 is provided outside the flexible case 1. The shape of the flexible cloth cover 9 matches the shape of the flexible case 1. The soft cloth cover 9 compromises two circular bottoms 91 and a hollow semi-cylinder 92 connecting the two circular bottoms 91. The flexible case 1 is placed in the hollow semi-cylinder 92 of the soft cloth cover 9, and the soft lamp 15 is provided on the curved surface of the flexible case 1 exposing the soft cloth cover 9. The manner in which the soft light 15 is fixed on the flexible case 1 is the same as that in the first embodiment, except that in this embodiment, the suction cup screws 13 are provided on the curved surface of the flexible case 1 where the soft cloth cover 9 is exposed. Both sides of the top of the hollow semi-cylinder 92 of the soft cloth cover 9 are provided with hook-and-loop fasteners 10 axially, and the soft cloth cover 9 is bonded to the edges of the soft lamp 15 with the hook-and-loop fasteners 10 to make the soft cloth cover 9 the flexible case 1 and the soft lamp 15 integrated. In addition, in this embodiment, the suction cup fixing seats 12 are provided on the curved surface of the flexible case 1 where the soft cloth cover 9 is exposed. The suction cup fixing seat 12 is the same as the embodiment shown in FIG. 8, and is used to fix the flexible case 1 and adjust the angle of the flexible case 1.

The above are only some embodiments of the present invention. For an ordinary person skilled in the art, without departing from the creative concept of the present invention, a number of modifications and improvements can also be made, which all fall within the protection scope of the present invention.

What is claimed is:

1. An inflatable soft box, comprising,
    a flexible case, an inflation nozzle is provided on the flexible case, and the inflation nozzle is used to inflate or deflate the flexible case;
    and, a soft lamp provided on the flexible case, the soft lamp is used to illuminate the flexible case; wherein
    the flexible case is provided with a transparent area and a lighting area;
    the transparent area is used to install the soft lamp, and the soft lamp is installed on the outside of the flexible case;
    a translucent soft cloth is provided on the lighting area, and the soft cloth is used to convert the light source of the soft lamp into soft light; and
    the transparent area is provided with a plurality of protrusions for contacting with the soft lamp.

2. The inflatable soft box according to claim 1, further comprising,
    a soft cloth cover, the soft cloth cover is provided outside the flexible case;
    the soft lamp is arranged on the area where the flexible case is exposed to the soft cloth cover, and the soft lamp and the soft cloth cover are detachably connected.

3. The inflatable soft box according to claim 2, wherein, the soft cloth cover is provided with a honeycomb grid on a side opposite to the soft lamp, and the honeycomb grid is connected to the flexible case.

4. The inflatable soft box according to claim 3, wherein, after the flexible case is inflated, the flexible case is any one of a sphere, a cylinder, a semi-cylinder, a cuboid, or a cube.

5. The inflatable soft box according to claim 2, wherein, after the flexible case is inflated, the flexible case is any one of a sphere, a cylinder, a semi-cylinder, a cuboid, or a cube.

6. The inflatable soft box according to claim 1, wherein, a plurality of suction cup fixing seats for fixing the flexible case are arranged on the outside of the flexible case.

7. The inflatable soft box according to claim 6, wherein, after the flexible case is inflated, the flexible case is any one of a sphere, a cylinder, a semi-cylinder, a cuboid, or a cube.

8. The inflatable soft box according to claim 1, wherein, the flexible case is also provided with a shading area, and the shading area is provided with an opaque shading cloth cover.

9. The inflatable soft box according to claim 8, wherein, after the flexible case is inflated, the flexible case is any one of a sphere, a cylinder, a semi-cylinder, a cuboid, or a cube.

10. The inflatable soft box according to claim 1, wherein, after the flexible case is inflated, the flexible case is any one of a sphere, a cylinder, a semi-cylinder, a cuboid, or a cube.

11. The inflatable soft box according to claim 1, wherein, after the flexible case is inflated, the flexible case is any one of a sphere, a cylinder, a semi-cylinder, a cuboid, or a cube.

12. The inflatable soft box according to claim 1, wherein, after the flexible case is inflated, the flexible case is any one of a sphere, a cylinder, a semi-cylinder, a cuboid, or a cube.

13. An inflatable soft box, comprising,
a flexible case, an inflation nozzle is provided on the flexible case, and the inflation nozzle is used to inflate or deflate the flexible case;
and, a soft lamp provided on the flexible case, the soft lamp is used to illuminate the flexible case;
a soft cloth cover, the soft cloth cover is provided outside the flexible case;
the soft lamp is arranged on the area where the flexible case is exposed to the soft cloth cover, and the soft lamp and the soft cloth cover are detachably connected;
wherein, the soft cloth cover is provided with a honeycomb grid on a side opposite to the soft lamp, and the honeycomb grid is connected to the flexible case;
wherein, the honeycomb grid is provided with elastic strips at positions close to corners, and two ends of the elastic strip are respectively fixed on two adjacent sides of the honeycomb grid.

14. The inflatable soft box according to claim 13, wherein, after the flexible case is inflated, the flexible case is any one of a sphere, a cylinder, a semi-cylinder, a cuboid, or a cube.

* * * * *